No. 687,948. Patented Dec. 3, 1901.
F. W. WOOD.
ELECTRIC SIGNALING AND INDICATING APPARATUS.
(Application filed May 13, 1901.)
(No Model.) 2 Sheets—Sheet 1.
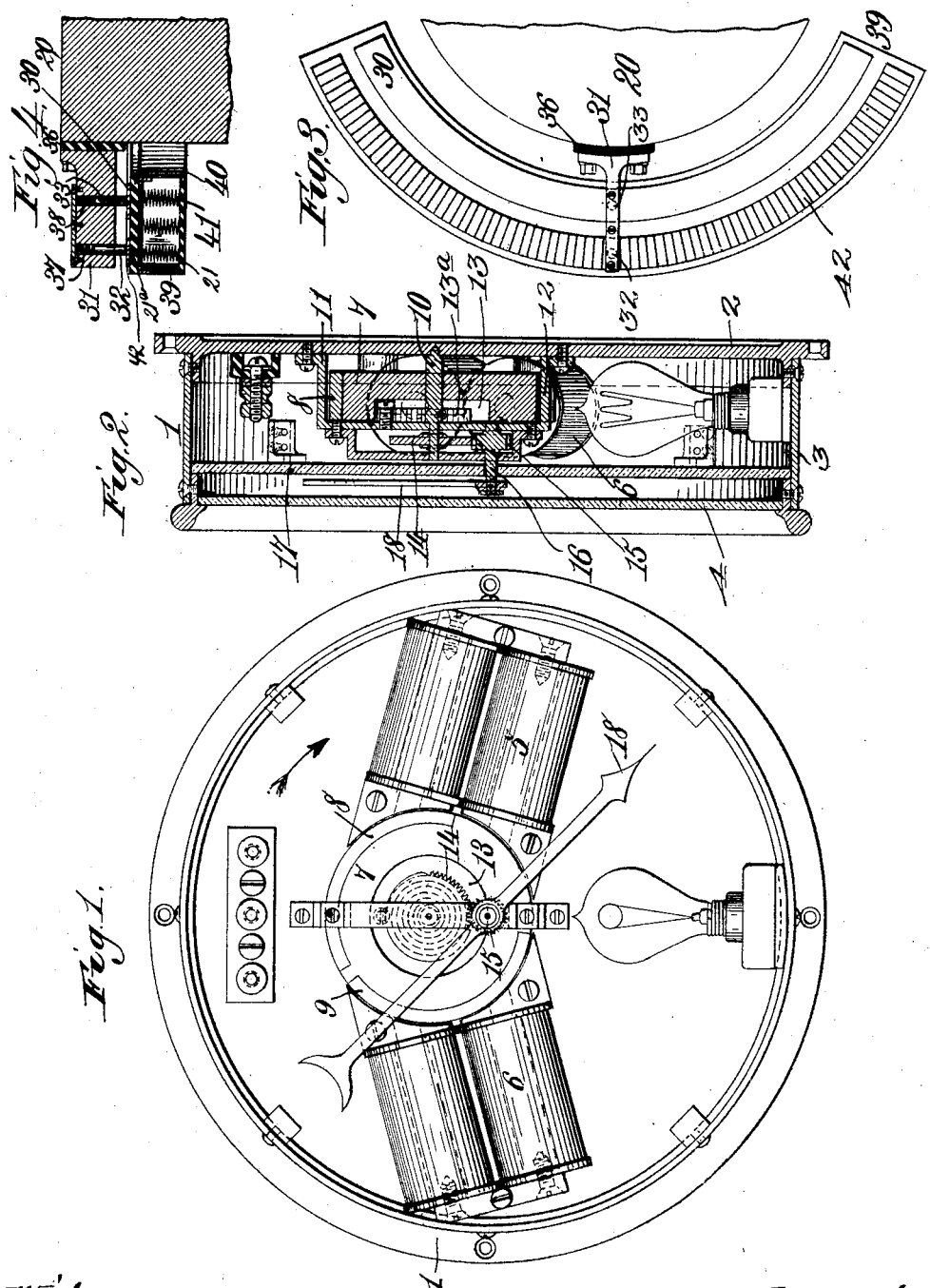
Witnesses,
W. H. Clarke
Robert Everett
Inventor.
By Frank W. Wood.
J. Granville Meyers Jr
Att'y No. 687,948. Patented Dec. 3, 1901.
F. W. WOOD.
ELECTRIC SIGNALING AND INDICATING APPARATUS.
(Application filed May 13, 1901.)
(No Model.) 2 Sheets—Sheet 2.
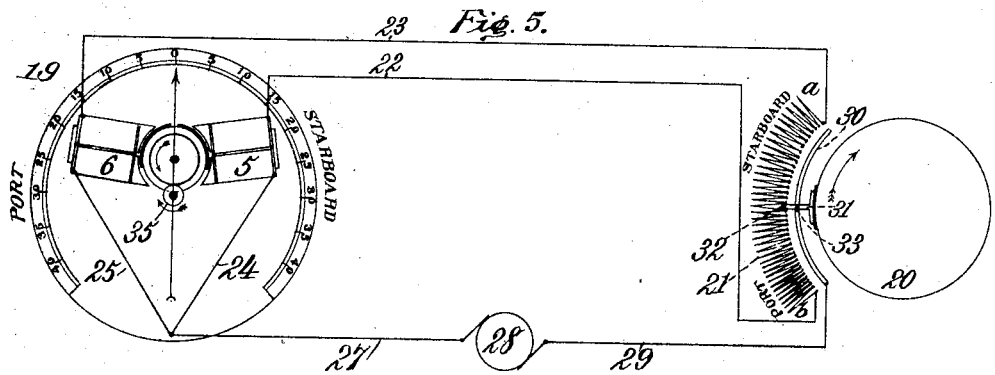
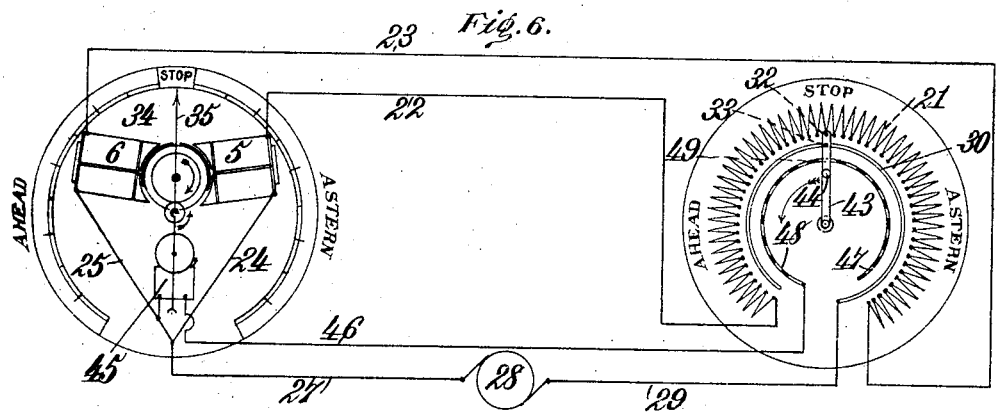
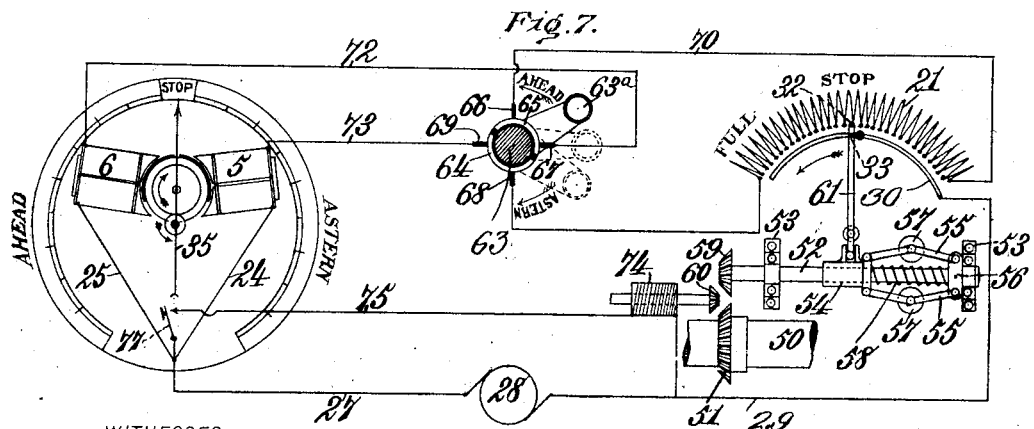
WITNESSES:
W. H. Clarke
Robert Emmett
INVENTOR
Frank W. Wood.
BY
J. Granville Meyers
ATTORNEY

UNITED STATES PATENT OFFICE.

FRANK W. WOOD, OF NEWPORT NEWS, VIRGINIA.

ELECTRIC SIGNALING AND INDICATING APPARATUS.

SPECIFICATION forming part of Letters Patent No. 687,948, dated December 3, 1901.

Application filed May 13, 1901. Serial No. 60,084. (No model.)

*To all whom it may concern:*

Be it known that I, FRANK W. WOOD, a citizen of the United States, residing at Newport News, State of Virginia, have invented new and useful Improvements in Electric Signaling and Indicating Apparatus, of which the following is a specification.

This invention relates to electric signaling and indicating apparatus, and is especially designed for use on shipboard for transmitting signals from one portion of the vessel to the other—as, for example, from the bridge or pilot-house to the engine-room and the like—for indicating the movements of the helm to show how the vessel is being steered, to indicate the number of revolutions of the propeller-shaft, and consequently the speed of the vessel, and whether the engines are running "ahead" or "astern."

My invention has for its object to provide an apparatus of the character described which will be simple and inexpensive in construction and efficient, accurate, and certain in operation, which may be easily installed with the minimum number of wires or conductors, which will be capable of transmitting a large number of signals or indicating a large number of conditions, which will not be affected by vibrations or shocks—such, for example, as those arising from the running of the machinery or the firing of guns—which may be easily repaired, and which will not be affected by changes of temperature and weather.

My invention also has in view certain other objects, which will hereinafter appear.

To these several ends my invention consists in the features and in the construction, combination, and arrangement of parts hereinafter described, and particularly pointed out in the claims following the description, reference being had to the accompanying drawings, forming a part of this specification, wherein—

Figure 1 is a view in elevation of the indicator. Fig. 2 is a vertical sectional view of the same, the dial being removed. Fig. 3 is a detail view showing the contact-arm. Fig. 4 is a detail sectional view of the contact-arm and resistance. Fig. 5 is a diagrammatic view showing the invention as arranged to indicate the shifting of the helm or movements of the rudder. Fig. 6 is a similar view showing the invention arranged for the transmission of signals or orders, and Fig. 7 is a similar view showing the invention arranged to indicate the speed of rotation of the propeller-shaft and the direction in which the engines are running.

Referring to Figs. 1 and 2 of the drawings, the numeral 1 indicates a circular casing preferably consisting of a flat circular back 2, a cylindrical body 3, and a glass front 4. Fixed in the casing, on opposite sides of the center thereof, are two electromagnets, respectively designated by the numerals 5 and 6, the longitudinal axes of the magnets being preferably arranged at a slight angle or inclination relatively one to the other, as shown. Disposed between the two magnets is a rotatable armature consisting of a solid disk 7, of non-metallic material or a material unaffected by the magnets and having fixed in its periphery two arc-shaped segments 8 and 9, of soft iron or other easily-attracted material. As most clearly shown in Fig. 1 of the drawings, two ends of said armature-segments are disposed relatively near to each other, while the other two ends are disposed considerbly farther apart, whereby the armature-segment 8 will only be acted upon by the magnet 5, and in like manner the armature-segment 9 will only be acted on by the magnet 6. The disk 7 is fixed on a spindle 10, journaled at one end in the back 2 of the casing and at its other end in two brackets 11 and 12, the bracket 11 being fixed to the back 2 and the bracket 12 to the bracket 11. Formed in the front face of the disk 7 is a circular recess 13, and disposed in said recess is a volute spring 13ª, one end of which is fixed to the spindle 10 and the other end to the bracket 11, said spring operating to normally hold the pointer or hand hereinafter described on the zero-mark on the dial, as will hereinafter appear. Fixed on the spindle 10 is a gear-wheel 14, which gears with a small pinion 15. The pinion is formed with or fixed on an arbor 16, one end of which is journaled in the bracket 11 and the other end is journaled in and projects through the bracket 12 and through a dial 17, fixed in the casing a short distance in rear of the glass front 4. On the outer end of the arbor 16 is fixed an index-hand or pointer 18, that is adapted to point to graduated indices or characters on the dial, as shown in Fig. 5. In practice the dial is illuminated by an incandescent lamp 18ᵃ, as shown in Figs. 1 and 2. By the arrangement described it will be evident that a slight movement of the rotatable armature will result in a relatively great movement of the hand or pointer, whereby while the armature never makes but a fraction of a complete rotation the hand or pointer may be caused to point to any one of the three hundred and sixty degrees of the dial, thus enabling a large number of signals or indications to be employed. It will of course be understood that in practice the zero-point of the graduated index will be so located that the pointer will point thereto when the armature is acted on alike by both magnets or when it is in a normal state of rest, and in the present arrangement such zero-point would be located on the edge of the dial directly above the axis of the armature and pointer.

It will be readily understood by those skilled in the art that if a stronger current of electricity be passed through the magnet 6 than through the magnet 5 the armature-segment 9 will be attracted by the magnet 6 and through the medium of the gear-wheel 15 and pinion 16 the hand or pointer 18 will be moved in the direction of the arrow shown in Fig. 1 of the drawings. It will also be evident that the extent to which the hand or pointer will be moved is dependent upon the difference in the strength of the currents passing through the two magnets, it being manifest that when one magnet is energized but slightly in excess of the other the oscillation of the rotatable armature will be proportionately slight and the movement of the hand or pointer will be correspondingly small. Hence it follows that the point on the dial to which the hand or pointer will be moved will be determined or governed by the difference in the strength of the currents passed through the two magnets. The manner in which the strength of the currents passing through the two magnets is regulated and controlled will now be described, it being premised that the construction and operation of the indicator in the several different applications or arrangements of the invention hereinafter explained are the same and are identical with those above described.

Referring to Fig. 5 of the drawings, the numeral 19 designates an indicator constructed in all respects in the manner above described, and 20 a ship's rudder-post. The numeral 21 indicates a resistance, shown in the present instance as having the general shape of an arc of a circle and arranged concentrically with the rudder-post. A leading-wire 22 connects one terminal of the resistance with the magnet 5 and a leading-wire 23 in like manner connects the other terminal of the resistance with the magnet 6. Two branch wires 24 and 25 lead from the magnets 5 and 6 and are connected with a wire 27, that leads to a generator 28, and from said generator leads another wire 29, that is connected to one end of an arc-shaped contact-segment 30, concentric with the resistance. Fixed to and turning with the rudder-post, but insulated therefrom, is a metallic bracket-arm 31, carrying two contacts 32 and 33, that are arranged to respectively engage the resistance 21 and the segmental terminal contact 30. The resistance and contacts above referred to constitute a rheostat, by means of which the strength of the currents passed through the two magnets may be regulated or controlled in a manner which will be readily understood by those skilled in the art. The operation of this arrangement of the invention is as follows: Let it be assumed that the helm is amidship, or, in other words, that the rudder is turned neither to starboard nor port. Then the contact 32, carried by the arm 31, will engage the resistance 21 at a point equidistant from the opposite ends of the latter. The circuit will then be from the generator 28 over the wire 29 to the terminal contact 30, thence through the contact 33, arm 31, and contact 32 to the resistance. The current will then be divided, one half passing over the wire 22 to the magnet 5 and from the latter by the branch wire 24 and the other half by the wire 23 to the magnet 6 and from the latter by the branch wire 25, the two currents uniting and passing back to the generator by the common return-wire 27. Two circuits of equal voltage will thus be completed through both the magnets, and the rotatable armature will be acted on on both sides alike, or, in other words, one magnet will neutralize the other, and hence the armature will not be affected and the hand or pointer will remain stationary or pointing to zero. Now let it be assumed that the helm is shifted to starboard or in the direction indicated by the arrow. As the rudder-post turns in the direction indicated by the arrow the arm 31 turns with it, moving the contact 32 over the resistance also in the direction of the arrow. The currents will again be divided and pass through the two magnets, as before described; but as the circuit is completed through the resistance at a point nearer to the terminal $a$ of the resistance than the point $b$ it follows that the current passing through the magnet 6 will be stronger than that passing through the magnet 5, and hence it follows that the rotatable armature will be turned in the direction of the arrow 34 and will turn the pointer or hand in the direction of the arrow 35. The distance to which the rotatable armature, and hence the hand, will be turned will of course be dependent upon the difference between the strength of the currents passing through the two magnets, and as this difference is regulated by throwing more or less resistance into one or the other of the magnet-circuits it will be manifest that the direction in which the hand or pointer is moved and the extent of such movement will be governed by the movement of the bracket-arm 31 and the rudder-post, by which said arm is carried. It will be seen from the foregoing that the pointer or hand accurately follows the movement of the bracket-arm and rudder and that any movement of the latter will be promptly indicated in degrees on the dial of the indicator, showing whether the rudder be turned to starboard or port and how far.

In Figs. 5, 6, and 7 the resistance and contacts are shown only diagrammatically; but I prefer to construct them as shown in Figs. 3 and 4. Referring to said figures of the drawings, the bracket-arm 31 is shown as insulated from the rudder-post by a sheet or plate of insulating material 36. Two vertical perforations or sockets are bored in said arm, and fitted to vertically move therein are the two contacts 32 and 33, consisting of carbon or other material. Disposed in the sockets above the carbon pencils are coiled springs, and fixed to the bracket-arm over the sockets is a plate 38, that serves to hold the springs in place. The springs 37 press the carbon pencils downward and hold them in contact with the resistance and terminal contact 30. The numeral 39 indicates a segmental hollow casing closed on its upper and lower sides by segmental plates 40 and 41, of insulating material. Fixed on the upper side of the plate 40 is the terminal contact 30, consisting of a flat segmental metallic plate, on which the contact 33 rests, and also fixed on said plate concentric with the terminal contact are a number of slightly-separated metallic contact plates or blocks 42. Disposed within the casing 39 is the resistance 21, consisting of a coil or series of coils of well-known and ordinary construction, each of the plates or blocks 42 being connected directly to the resistance by connecting-wires 21ª. (Shown in Fig. 4.) The contact 32 is adapted to successively engage the contact-blocks 42 as the arm 31 sweeps over the casing and completes the circuit at different points in the resistance, the contact 33 being at all times in engagement with the terminal contact 30. The operation is as before described. In Fig. 6 I have shown the invention applied to a signal-transmitter instead of to the steering mechanism for transmitting signals from one point to another. In such an arrangement I prefer to form the resistance 21 in nearly a complete circle, and also the terminal contact 30. In this form of the invention the contacts 32 and 33 are carried by a swinging arm 43, pivoted at its center centrally within the resistance and terminal contact and carrying a knob or handle 44, by means of which the arm may be turned to any desired point by hand. I prefer to provide the indicator with an alarm. In Fig. 6 I have shown the alarm as consisting of an electric bell 45, one terminal of which is connected to one of the branch wires, as 25, and the other terminal is connected by a wire 46 with one end of a nearly-circular contact maker and breaker 47, arranged concentrically within the terminal contact 30. Said contact maker and breaker is composed of a curved metallic strip, in the face of which are inserted at slight distances apart blocks or pieces of insulating material 58 in a manner which will be well understood by those skilled in the art, and the arm 43 is provided with a third carbon pencil or contact 49, that rests upon said contact maker and breaker. The operation of this form of the invention will be readily understood from the description heretofore given with relation to Fig. 5 of the drawings. If the arm 43 be turned in the direction of the arrow shown in Fig. 6, a greater part of the resistance will be thrown into the circuit in which the wire 23 is included and a lesser portion into the circuit in which is included the wire 22. Hence the magnet 5 will be more strongly energized than the magnet 6, and therefore the rotatable magnet and the index-hand or pointer will be turned to the direction of the arrows, the movement of the index-hand or pointer closely following the movement of the arm 43, as before described. It will be understood, therefore, that when the arm 43 is turned to any given point to transmit a certain signal the index-hand or pointer 18 on the indicator will be turned to a corresponding point on its dial and point to the graduated mark on the dial designating the signal transmitted. As the arm 43, however, is moved in one direction or the other to transmit the desired signal the contact 49 sweeps over the contact maker and breaker and a branch circuit is closed through the bell 45 by the wire 29, terminal contact 30, arm 43, contact maker and breaker 47, and wires 46 and 27, thus ringing the bell and giving audible notification that a signal has been transmitted to the indicator. In practice the insulated portions 48 of the contact maker and breaker will be so arranged relatively to the points to which the arm 43 will be turned to transmit signals that when said arm is resting at any one of said points the contact 49 will rest on one of said insulated posts 48 and the circuit through the bell will be broken. Hence it follows that the bell will be sounded only during the time the arm 43 is being moved to bring it into position to transmit the signal. It will be readily understood that other alarms than a bell can be employed.

In Fig. 7 I have shown a still further application of my invention on shipboard—viz., to indicate the direction in which the engines are running and the number of revolutions of the propeller-shaft, and hence the speed of the vessel. In the arrangement now to be described the construction and operation of the indicator are the same as those heretofore described and the construction and arrangement of the resistance and terminal contact are the same as those described with reference to Fig. 5 of the drawings. Referring to Fig.

7, the numeral 50 indicates the propeller-shaft, (or it may be the engine-shaft or a shaft geared to either the propeller or engine shafts,) on which is fixed, for example, a beveled wheel 51, and the numeral 52 indicates the shaft of a centrifugal governor, journaled to the shaft 50 in suitable bearings 53. Loosely arranged on the governor-shaft 52 and adapted to freely slide back and forth thereon is a sleeve 54, to which are pivoted two toggle-levers 55, one end of each of said levers being pivoted to the sleeve 54 and the other end to a yoke 56 on the governor-shaft. Said toggle-levers each carry a ball or weight 57, as usual, and between the sleeve 54 and yoke 56 is arranged a coiled spring 58, which operates to normally spread the sleeve and yoke apart. The governor is of ordinary and well-known construction and need not therefore be further described. Fixed on the end of the governor-shaft 52 is a beveled gear 59, and adapted to be thrown into simultaneous engagement with said gear and the wheel 51 is a beveled gear 60. The contacts 32 and 33 are carried on an oscillating arm 61, pivoted, as at 62, and loosely engaging at its opposite end the sleeve 54 on the governor-shaft. The numeral 63 indicates the reversing-shaft of the engine and 63ª the reversing lever or crank. On the reversing-shaft and insulated therefrom are two substantially semicircular metallic segments 64 and 65, that are insulated from one another at their adjacent ends. Arranged to engage said segments are four contacts respectively designated by the numerals 66, 67, 68, and 69, which are conveniently arranged at ninety degrees from one another. From the contact 66 leads a wire 70, which is connected to one terminal of the resistance 21, and the other terminal thereof is connected by a wire 71 with the contact 68. A wire 72 leads from the contact 67 to the magnet 6, and similarly a wire 73 leads from the contact 69 to the magnet 5. The gear 60 is fixed on one end of the armature of solenoid 74, the terminals of which are respectively connected by wires 75 and 76 to the wires 27 and 29, a switch 77 being arranged on the indicator for closing and breaking the circuit through the solenoid. The operation of this form of the invention is as follows: When the reversing-lever 63 is in the position shown by full lines in Fig. 7, the engine is set to run ahead. If now it be desired to ascertain the number of revolutions the shaft 50 is making per minute, or, in other words, the speed the engine is running at, the switch 77 is closed, energizing the solenoid and thrusting the gear 60 into engagement with the beveled wheel 51 and the gear 59. The governor-shaft will then rotate with the shaft 50 and the weighted toggle-lever 55 will be thrown outward to a greater or less extent (depending upon the speed of rotation of the shaft 50) and will slide the sleeve 54 on the governor-shaft, thus oscillating the arm 61 and moving the contacts 32 and 33 over the resistance and terminal contact in the direction indicated by the arrow. The greater part of the resistance will then be thrown into the circuit including the wire 70. The reversing-lever being set to cause the engine to run ahead, the circuits may be traced from the generator 28 to the contact-terminal 30 by the wire 29, thence by the contacts 32 and 33 and arm 61 to the resistance 21, where the circuit is divided, as heretofore described, the stronger current passing over wire 71 and contact 68 to the contact-segment 64 on the reversing-shaft, and from the latter by contact 69 and wire 73 to the magnet 5, and from the latter by wires 24 and 27 to the generator. The weaker current passes by wire 70 and contact 66 to the segment-contact 65, and thence by contact 67 and wire 72 to the magnet 6, and from the latter by wires 25 and 27 to the generator. The magnet 5 then will be more strongly energized than the magnet 6 and will cause the rotatable armature and the index-hand or pointer to move in the direction of the arrows a distance proportionate to the distance the arm 61 has been moved over the resistance, thus indicating on the dial the direction in which the engine is running and the number of revolutions the shaft 50 is making in a given unit of time, it being understood, of course, that the dial is graduated and that the graduations bear a fixed ratio or relation to the number of revolutions made by the shaft. If the reversing-lever 63 be now turned to set the engine running astern, as indicated by dotted lines, it will be evident that the contacts 67 and 68 will engage the contact-segment 65 and that the contacts 66 and 69 will in like manner engage the contact-segment 64. Then the two circuits may be traced as follows: Starting from the resistance the stronger current will pass by wire 71 and contact 69 to the segment-contact 65, thence by contact 67 and wire 72 to the magnet 6, and from the latter by wires 25 and 27 to the generator. The other or weaker current will pass by wire 70 and contact 66 to the contact-segment 64, thence by contact 69 and wire 73 to the magnet 5, and from the latter by wires 24 and 27 to the generator. The magnet 6 will now be the more strongly energized, and hence the rotatable armature and index-hand or pointer will be moved in a direction reverse to that indicated by arrows, indicating that the engine is running astern and a distance proportionate to the distance the arm 61 has been moved over the resistance, indicating the number of revolutions the shaft 50 is making. When the reversing-lever is moved to a position midway between the two positions above referred to, the contacts 67 and 69 will rest on the insulation between the segments 64 and 65, and hence the circuits through the magnets will be broken and the index-hand or pointer will remain at zero, thus indicating that the engine has been stopped. When the switch 77 is opened, the circuit through the solenoid will be broken, whereupon the idler-gear 60 will cease to transmit the motion of the shaft 50 to the governor-shaft, and the spring 59 will then force the sleeve 54 along the governor-shaft, causing the arm 61 to move the contact 32 to a neutral point on the resistance. The currents passing through both magnets will then be equal and the index-hand will point to zero, as before described.

I have shown and described my invention as especially designed for use on shipboard, but it will be obvious that it may be applied to various different uses.

Having described my invention, what I claim is—

1. In an apparatus of the class described, the combination with an indicator comprising two magnets, a rotatable armature arranged between the magnets, and an index-hand actuated by said armature, of a transmitter comprising a resistance, conductors leading from the terminals of the resistance to the respective magnets, a generator, return-conductors leading from the magnets to the generator, a conductor leading from the generator to a terminal contact in proximity to the resistance, and a movable contact-arm arranged to sweep over the resistance and terminal contact and simultaneously increase the potential of one magnet and decrease that of the other, substantially as described.

2. In an apparatus of the class described, the combination with an indicator comprising two magnets, a rotatable armature arranged between the magnets, and an index-hand actuated by said armature, of a transmitter consisting of a rheostat, a generator, conductors leading from the terminals of the rheostat to the respective magnets, return-conductors leading from the magnets to the generator and a conductor leading from the generator to the rheostat, substantially as described.

3. In an apparatus of the class described, the combination with an indicator comprising two magnets, a rotatable armature arranged between the magnets, and an index-hand actuated by the armature, of a generator, two circuits fed by the generator and leading to the respective magnets, return-conductors leading from the magnets to the generator, and means for passing a current of greater voltage over one of said circuits than the other, substantially as described and for the purpose specified.

4. In an apparatus of the class described, the combination with an indicator comprising two magnets, a rotatable armature arranged between the magnets, and an index-hand actuated by the armature, of a generator, two circuits fed by the generator and leading to the respective magnets, return-conductors leading from the magnets to the generator, and means for simultaneously increasing the voltage of the current passing over one of said circuits and simultaneously decreasing the voltage of the other, substantially as described and for the purpose specified.

5. In an apparatus of the class described, the combination with an indicator comprising two magnets, a rotatable armature arranged between the magnets, and an index-hand actuated by the armature, of a generator, two circuits leading from the generator to the magnets, return-conductors leading from the magnets to the generator, and means for diverting any desired portion of the current from one of said circuits to the other at will, substantially as described and for the purpose specified.

6. In an apparatus of the class described, the combination with an indicator comprising two magnets, a rotatable armature arranged between the magnets, and an index-hand actuated by the armature, of a generator, two circuits leading from the generator to the magnets, return-conductors leading from the magnets to the generator, a resistance common to both of said circuits, and means for causing the current through one of said circuits to traverse a greater portion of the resistance than the current through the other circuit, substantially as described and for the purpose specified.

7. In an apparatus of the class described, the combination with an indicator comprising two magnets, a rotatable armature arranged between the magnets, and an index-hand actuated by the armature, of a transmitter comprising a segment-shaped resistance, conductors leading from the two terminals of the resistance to the respective magnets, a generator, return-conductors leading from the magnets to the generator, a pivoted contact-arm arranged to sweep over said resistance, and a conductor leading from the generator and in constant electrical connection with said contact-arm, substantially as described.

8. In an apparatus of the class described, the combination with an indicator comprising two magnets, a rotatable armature arranged between the magnets, and an index-hand actuated by the armature, of a transmitter comprising a segment-shaped resistance, a segment-shaped terminal contact arranged parallel with the resistance, and a pivoted contact-arm carrying contacts arranged to sweep over said resistance and terminal contact, a generator, conductors leading from the two terminals of the resistance to the respective magnets, return-conductors leading from the magnets to the generator, and a conductor leading from the generator to the pivoted contact-arm, substantially as described and for the purpose specified.

9. In an electrical indicator, the combination with a rotatable armature consisting of a rotatable disk of non-magnetic material having fixed on its periphery two separated segments of magnetic material, of two electro-magnets arranged on opposite sides of said disk, an index-hand actuated by the rotary armature, and means for differentially energizing said magnets, substantially as described.

10. In an electrical indicator, the combination with a rotatable armature consisting of a rotatable disk of non-magnetic material having fixed on its periphery two separated segments of magnetic material, of two electromagnets arranged on opposite sides of said disk, an index-hand actuated by the rotary armature, means for differentially energizing said magnets, and means for positively returning said armature to a neutral point between the magnets, substantially as described.

11. In an electrical indicator, the combination with a rotatable armature consisting of a rotatable disk of non-magnetic material having fixed on its periphery two separated segments of magnetic material, of two electromagnets arranged on opposite sides of said disk, an index-hand actuated by the rotary armature, means for differentially energizing said magnets, and a spring for normally holding said armature neutral between the magnets, substantially as described.

12. In an electrical indicator, the combination with a rotatable armature consisting of a rotatable disk of non-magnetic material having fixed on its periphery two separated segments of magnetic material, of two electromagnets arranged on opposite sides of said disk, an index-hand actuated by the rotary armature, means for differentially energizing said magnets, and a volute spring arranged within a recess formed in one of the faces of the said disk, one end of said spring being fixed to the axis of the disk and its other end to a fixed support, substantially as described and for the purpose specified.

13. In an electrical indicator, the combination with a rotatable armature consisting of a rotatable disk of non-magnetic material fixed on a shaft and having fixed on its periphery two separated segments of magnetic material, of two electromagnets arranged on opposite sides of said disk, a gear-wheel fixed on the shaft of the armature, an index-hand, a pinion fixed on the arbor of the index-hand and gearing with said gear-wheel, and means for differentially energizing the electromagnets, substantially as described.

14. In an electrical indicator, the combination with a rotatable armature, of two electromagnets, arranged on opposite sides of said armature, a pivoted index-hand, multiplying gearing actuated by the rotary armature for communicating an augmented movement to the index-hand, and means for differentially energizing the electromagnets, substantially as described.

15. The combination with an indicator comprising two magnets, a rotatable armature arranged between the magnets and an index-hand actuated by said armature, of a transmitter comprising a resistance, conductors leading from the terminals of the resistance to the respective magnets, a generator, return-conductors leading from the generator to a terminal contact in proximity to the resistance, a driven shaft, a speed-governor actuated thereby, and a movable contact-arm arranged to be swept over the resistance and terminal contact by the speed-governor and simultaneously increase the potential of one magnet and decrease that of the other to actuate the index-hand and indicate the speed of rotation of the shaft, substantially as described.

16. The combination with an indicator comprising two magnets, a rotatable armature arranged between the magnets and an index-hand actuated by said armature, of a transmitter comprising a segment-shaped resistance, conductors leading from the terminals of the resistance to the respective magnets, a generator, return-conductors leading from the magnets to the generator, a conductor leading from the generator to a terminal contact concentric with the resistance, a driven shaft, a speed-governor actuated thereby, and a pivoted contact-arm arranged to be swept over the resistance and terminal contact by the speed-governor and simultaneously increase the potential of one magnet and decrease that of the other, substantially as described and for the purpose specified.

17. The combination with an indicator comprising two magnets, a rotatable armature arranged between the magnets, and an index-hand actuated by said armature, of a transmitter comprising a segment-shaped resistance, conductors leading from the magnets to the generator, a conductor leading from the generator to a terminal contact concentric with the resistance, a driven shaft, a centrifugal speed-governor actuated thereby, and an oscillating contact-arm pivoted intermediate its ends and arranged to be swept over the resistance and terminal contact by the speed-governor and simultaneously increase the potential of one magnet and decrease that of the other, substantially as described and for the purpose specified.

18. The combination with an indicator comprising two magnets, a rotatable armature arranged between the magnets, and an index-hand actuated by said armature, of a transmitter comprising a resistance, conductors leading from the terminals of the resistance to the respective magnets, a generator, return-conductors leading from the magnets to the generator, a conductor leading from the generator to a terminal contact in proximity to the resistance, a driven shaft, a speed-governor actuated thereby, a movable contact-arm arranged to be swept over the resistance and terminal contact by the speed-governor, a branch circuit leading from one of the return-conductors to the conductor leading from the generator to the terminal contact, a solenoid included in the branch circuit, means controlled by the solenoid for throwing the speed-governor into and out of operation, and means for making and breaking the branch circuit, substantially as described.

19. The combination with an indicator comprising two magnets, a rotatable armature arranged between the magnets, and an index-hand actuated by said armature, of a transmitter comprising a resistance, conductors leading from the terminals of the resistance to the respective magnets, a generator, return-conductors leading from the magnets to the generator, a conductor leading from the generator to a terminal contact in proximity to the resistance, a driven shaft, a speed-governor for driving the governor from said shaft, a movable contact-arm arranged to be swept over the resistance and terminal contact by the speed-governor, a branch circuit leading from one of the return-conductors to the conductor leading from the generator to the terminal contact, a solenoid included in the branch circuit, means actuated by the solenoid for throwing the said gearing into and out of operation, and a switch located at the indicator for making and breaking the branch circuit, substantially as described.

20. The combination with an indicator comprising two magnets, a rotatable armature arranged between the magnets, and an index-hand actuated by said armature, of a transmitter comprising a resistance, conductors leading from the resistance to the respective magnets, a generator, return-conductors leading from the magnets to the conductor and from the latter to a terminal contact in proximity to the resistance, a driven shaft, a speed-governor actuated by said shaft, a movable contact-arm arranged to be swept over the resistance and terminal contact by the governor, an engine-reversing shaft, and means actuated by the reversing-shaft for transposing the currents from the resistance to the magnets, substantially as described and for the purpose specified.

In testimony whereof I have hereunto set my hand in presence of two subscribing witnesses.

FRANK W. WOOD.

Witnesses:
THEODORE L. GATCHEL,
G. F. MASON.